(No Model.) 4 Sheets—Sheet 1.
J., M., C., & L. JEFFERSON.
MACHINE FOR DRYING FABRICS, YARNS, &c.
No. 310,683. Patented Jan. 13, 1885.
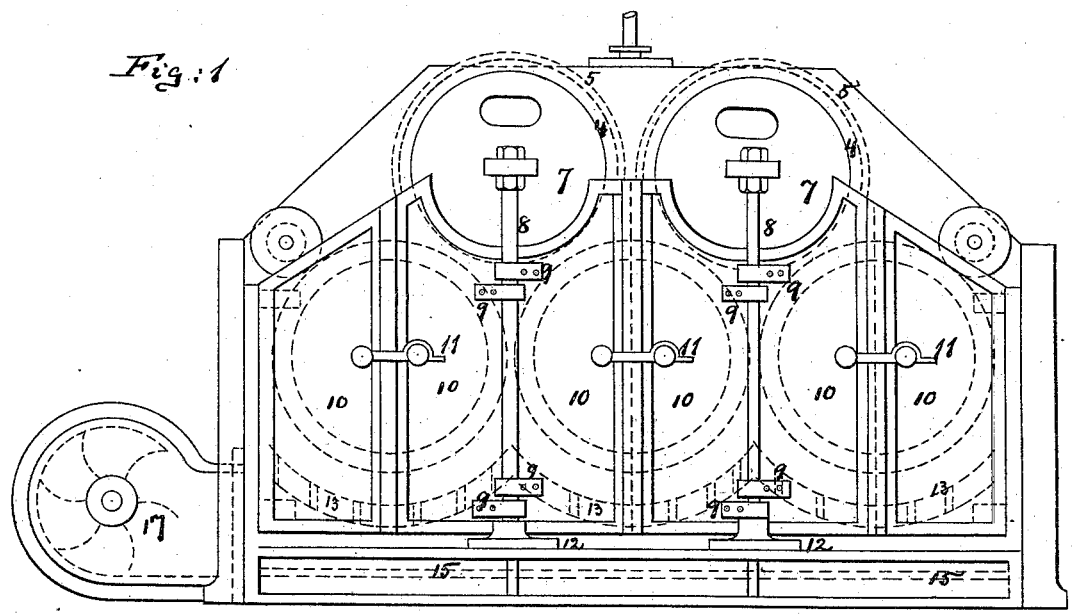
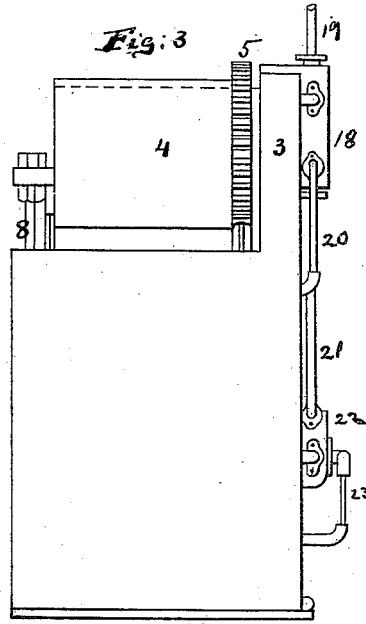
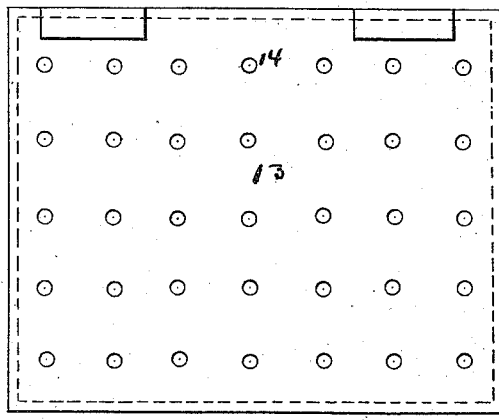
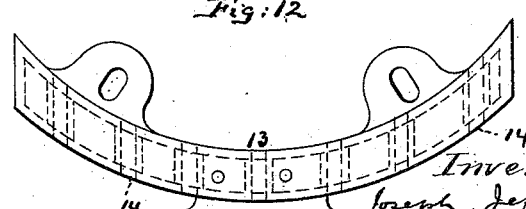
Witnesses:
John C. Tunbridge.
John M. Speer.
Inventors:
Joseph Jefferson
Mordecai Jefferson
Cornelius Jefferson
Lazarus Jefferson
by their attorneys
Briesen & Steele (No Model.) 4 Sheets—Sheet 2.
J., M., C., & L. JEFFERSON.
MACHINE FOR DRYING FABRICS, YARNS, &c.
No. 310,683. Patented Jan. 13, 1885.
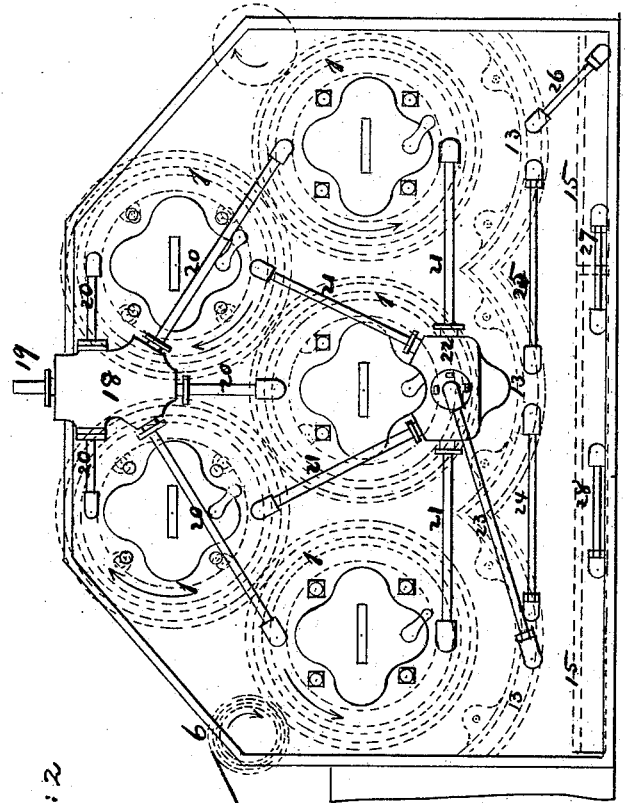
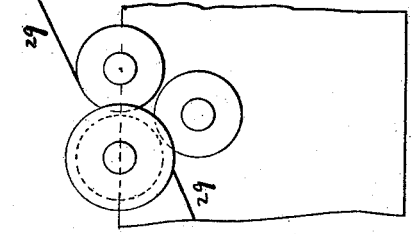
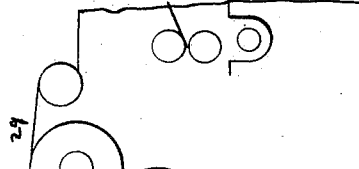
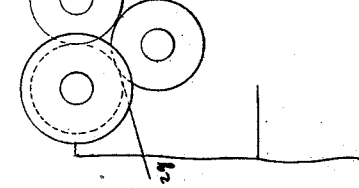
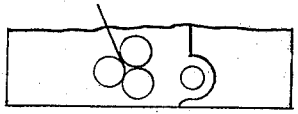
Witnesses:
John C. Tunbridge
John M. Speer.
Inventors:
Joseph Jefferson
Mordecai Jefferson
Cornelius Jefferson
Lazarus Jefferson
by their attorneys
Briesen, Steele (No Model.) 4 Sheets—Sheet 3.
J., M., C., & L. JEFFERSON.
MACHINE FOR DRYING FABRICS, YARNS, &c.
No. 310,683. Patented Jan. 13, 1885.
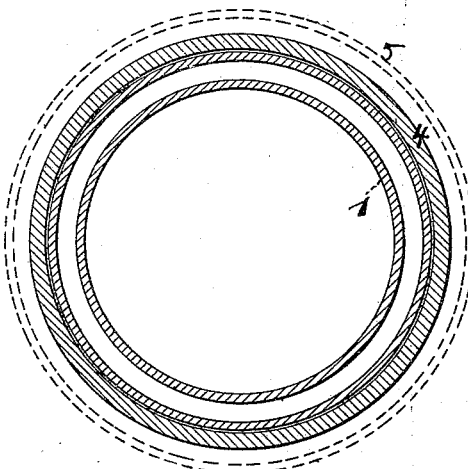
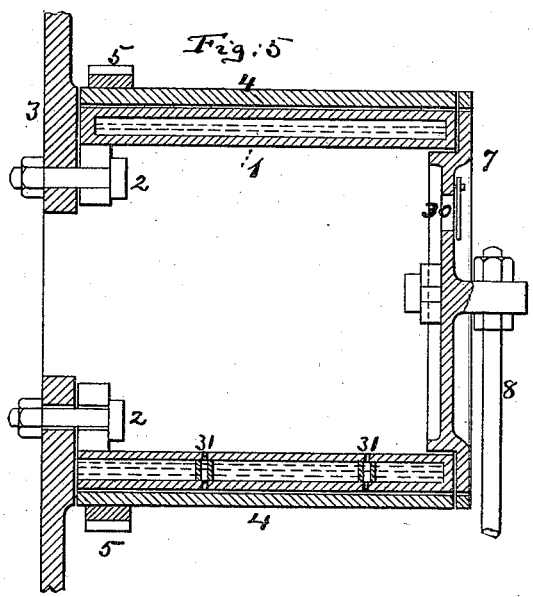
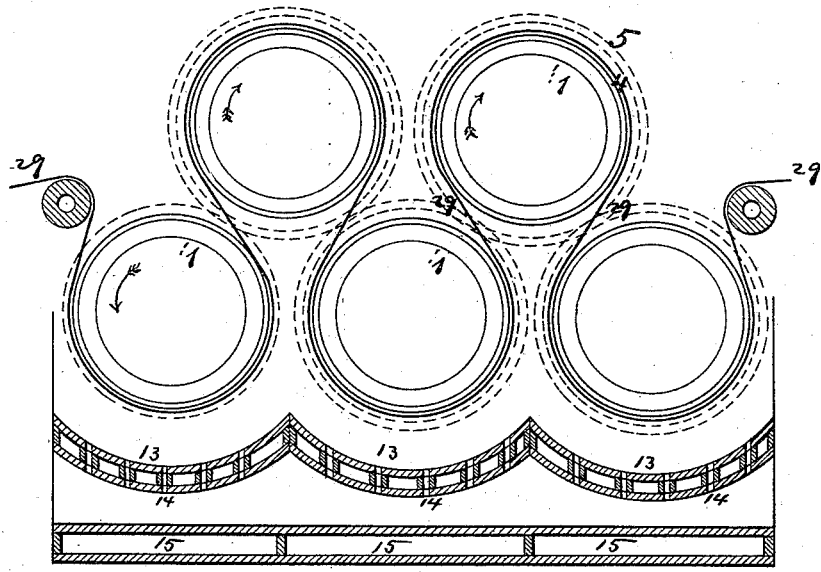
Witnesses:
John C. Tunbridge.
John M. Speer.
Inventors:
Joseph Jefferson
Mordecai Jefferson
Cornelius Jefferson
Lazarus Jefferson
by their attorneys
Briesen & Steele (No Model.) 4 Sheets—Sheet 4.
J., M., C., & L. JEFFERSON.
MACHINE FOR DRYING FABRICS, YARNS, &c.
No. 310,683. Patented Jan. 13, 1885.
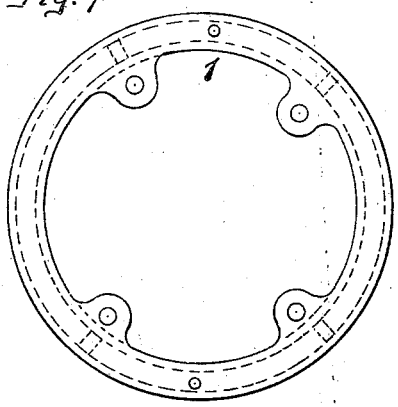
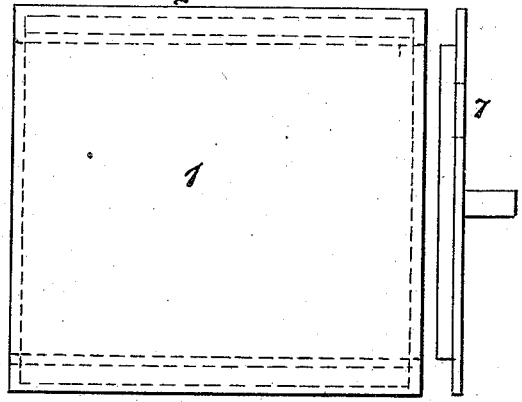
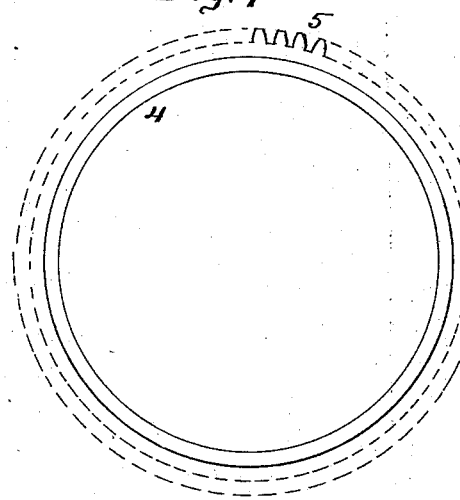
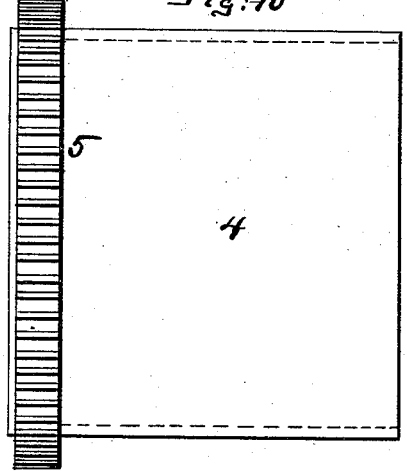
Witnesses:
John C. Tunbridge.
John M. Speer.
Inventors:
Joseph Jefferson
Mordecai Jefferson
Cornelius Jefferson
Lazarus Jefferson
by their attorneys
Briesen & Steele

United States Patent Office.

JOSEPH JEFFERSON, MORDECAI JEFFERSON, CORNELIUS JEFFERSON, AND LAZARUS JEFFERSON, OF BRADFORD, COUNTY OF YORK, ENGLAND.

MACHINE FOR DRYING FABRICS, YARN, &c.

SPECIFICATION forming part of Letters Patent No. 310,683, dated January 13, 1885.

Application filed July 21, 1884. (No model.) Patented in England January 1, 1884, No. 227.

*To all whom it may concern:*

Be it known that we, JOSEPH JEFFERSON, MORDECAI JEFFERSON, CORNELIUS JEFFERSON, and LAZARUS JEFFERSON, subjects of Her Britannic Majesty Queen Victoria, residing at Bradford, in the county of York, England, have invented new and useful Improvements in Machines for Drying Fabrics, Yarn, &c., (for which we have applied for a patent in Great Britain, No. 227, bearing date January 1, 1884,) of which the following is a specification.

This invention relates to machines for drying fabrics, yarn, &c.

The invention consists of the new combination of parts hereinafter specified.

Figure 1 is a side elevation of the improved drying apparatus. Fig. 2 is an elevation of the opposite side of the machine, showing, also, the rollers and washing-trough, some of the parts being broken away. Fig. 3 is an end elevation of the machine, taken at the right of Fig. 1. Fig. 4 is a longitudinal vertical section of the same. Fig. 5 is a longitudinal section of one of the drying-cylinders. Fig. 6 is a cross-section of the same. Figs. 7, 8, 9, and 10 are views of the steam-jacket and drying-cylinder. Figs. 11 and 12 are a plan and an end elevation, respectively, of one of the lower perforated radiating steam-chambers. Figs. 5 to 12, inclusive, are on an enlarged scale.

At 1 1 are the hollow cylindrical steam-jackets, each secured by the bolts 2 2 2 to the side frame, 3, and each embraced by a revolving drying-cylinder, 4. Each revolving drying-cylinder 4 is heated by the steam in jacket 1, and is provided with teeth 5, so that the several revolving drying-cylinders 4 gear with each other and revolve in the direction shown by arrows, being driven by the pinion 6, which has its bearings in the housing or frame of the machine. The lower tier of these revolving drying-cylinders is supported in the housing of the machine, which incloses the sides and ends thereof, leaving the top open. Each revolving drying-cylinder 4 in the upper tier is held in position on the steam-jackets 1 by the end plate or disk, 7, which is carried by the adjustable upright rod 8. The said rod 8 also serves as a bolt for the hinges 9 9 of the doors 10 10.

11 11 are the holding-latches of the doors 10.

At 12 12 are the supports for the upright rods 8.

Below the revolving drying-cylinders 4 4 are the radiating steam-chambers 13, which have vertical perforations 14 formed therein by short lengths of pipes passed through them. (See Fig. 4.)

Below the steam-chambers 13 are horizontal steam-chambers 15 15.

17 is a fan for circulating the hot air.

The supply of steam to the several steam-jackets is shown at Figs. 2 and 3, wherein 18 is the main inlet, comprising a "six-way valve," 19 the inlet-pipe, and 20 the distributing-pipes.

At 21 are the circulating-pipes by which the steam from the jackets 1 is passed to the valve 22, thence by pipe 23 to one of the perforated radiating steam-chambers 13, and by pipe 24 therefrom to the other perforated chamber 13, and by pipe 25 to the end perforated chamber 13; thence by pipe 26 to one of the lower horizontal chambers 15, and by pipe 27 to the next chamber 15; thence by pipe 28 to end chamber 15, from which the steam may be discharged through a suitable aperture. (Not shown.)

29 indicates the sliver, yarn, or piece of fabric to be dried, showing its course around the rollers, that are hung in the housing of the machine and over the drying-chambers. The interior of revolving drying-cylinders 4 is lubricated by way of the hand-hole 30 and the pipes 31 through the jacket 1.

We are aware that prior to our invention steam-charged revolving cylinders have been made. To such we lay no claim; but What we do claim as our invention, and desire to secure by Letters Patent, is—

1. The combination of the steam-jackets 1, revolving drying-cylinders 4, perforated steam-chambers 13 13, and horizontal steam-chambers 15 15 with each other and with steam-supply pipes and supports for the steam-jackets, substantially as shown and set forth.

2. The combination of the revolving drying-cylinders 4, disks 7, steam-jackets 1, rods 8, doors 10, perforated steam-chambers 13, connecting-pipes and supports for the rods 8 and the steam-jackets, substantially as shown and set forth herein.

3. The combination of the radiating perforated steam-chambers 13 with the revolving drying-cylinders 4, steam-jackets 1, connecting-pipes and supports for the steam-chambers, steam-jackets, and revolving drying-cylinders, substantially as herein shown and described.

JOSEPH JEFFERSON.
MORDECAI JEFFERSON.
CORNELIUS JEFFERSON.
LAZARUS JEFFERSON.

Witnesses:
WALTER BRIERLEY,
PATIENCE JEFFERSON.